United States Patent
Scott De Martinville et al.

(10) Patent No.: US 6,660,314 B2
(45) Date of Patent: Dec. 9, 2003

(54) LOW WATER ACTIVITY FLAVORED FILLING FOR BAKED FLOUR BASED PRODUCTS

(75) Inventors: Jaswinder Scott De Martinville, Chernex (CH); Jorge Chirife, Buenos Aires (AR)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 10/195,116

(22) Filed: Jul. 11, 2002

(65) Prior Publication Data

US 2003/0008039 A1 Jan. 9, 2003

Related U.S. Application Data

(63) Continuation of application No. PCT/EP00/00292, filed on Jan. 12, 2000.

(51) Int. Cl.[7] .............................................. A21D 13/00
(52) U.S. Cl. .................... 426/94; 426/496; 426/572; 426/658; 426/659; 426/660
(58) Field of Search .................... 426/94, 572, 496, 426/658, 659, 660

(56) References Cited

U.S. PATENT DOCUMENTS

| | | | | | |
|---|---|---|---|---|---|
| 3,656,967 | A | * | 4/1972 | Barton et al. | 99/86 |
| 4,774,095 | A | * | 9/1988 | Kleinschmidt et al. | 426/94 |
| 5,374,438 | A | * | 12/1994 | Yost | 426/497 |
| 5,455,059 | A | * | 10/1995 | Mcfeaters | 426/578 |
| 5,607,716 | A |   | 3/1997 | Doherty et al. | 426/660 |

FOREIGN PATENT DOCUMENTS

| DE | 196 15 369 A1 | 10/1996 |
|---|---|---|
| GB | 2 273 642 A | 6/1994 |

\* cited by examiner

*Primary Examiner*—Lien Tran
(74) *Attorney, Agent, or Firm*—Winston & Strawn LLP

(57) ABSTRACT

A polyhydric alcohol-free flavored filling for baked flour based products is disclosed. These fillings include an aqueous phase, a mixture of sugars dissolved in the aqueous phase wherein the mixture comprises fructose, glucose and sucrose in relative proportions which prevents crystallization and set water activity value from 0.38 to 0.47, and an amount of flavoring and acidifying component. The filling provides an extended shelf life and preserves the crispness of baked flour based products in which it is included during the extended shelf life.

11 Claims, No Drawings

LOW WATER ACTIVITY FLAVORED FILLING FOR BAKED FLOUR BASED PRODUCTS

CROSS-REFERENCE TO RELATED APPLICATIONS

This application is a continuation of the US national phase designation of International application PCTEP00/00292 filed Jan. 12, 2000, the content of which is expressly incorporated herein by reference thereto.

TECHNICAL FIELD

The present invention relates to the field of flavored sugar fillings or jams for baked flour-based products, and in particular to flavored fillings comprising an amount of flavoring component and sugar in aqueous phase. The invention also relates to the baked flour-based product comprising such flavored filling.

BACKGROUND ART

Conventional fruit jams are known. Fruit jams (e.g., strawberry jams) are generally prepared by mixing fruit pulp with sugars, i.e., sucrose, and have a high moisture content. Water activity ("Aw") reflects moisture content of a food product. For conventional fruit jam, Aw ranges from 0.7 to 0.8. Due to this high Aw, the moisture transfer from the jam to the baked flour based products (e.g., biscuits) is very high. The driving force for this moisture transfer is the difference in water activity between the jam and the initially drier biscuit. Therefore, water migrates rapidly from the jam to the biscuit because the biscuit has a lower water activity (e.g., an Aw of about 0.2) until the water activity equilibrium is attained. The time to reach this water activity equilibrium depends, among other factors, of the Aw of the jam, the percentage of jam in the biscuit, etc., but equilibrium is usually observed after few days of storage. Thus, conventional fruit jams cannot be used to produce a crispy biscuit since they rapidly "wet" the biscuit. As a consequence of the rapid loss of crisp texture, the filled product is not attractive for the consumer and it also has a poor shelf life with a stale taste.

Therefore, fruit jam-filled biscuits on the market are either "soft", or they have non-aqueous fillings comprising vegetable fat plus colorings and flavorings.

Usually, in order to avoid sugar crystallization in the aqueous phase, the water activity of flavored fillings is lowered by the addition of non-sugar ingredients such as sorbitol, glycerol or other polyhydric alcohols. However, the polyhydric alcohols-based products suffer from flavor, taste and texture problems. Polyhydric-alcohols cause undesirable tastes in the filling although they are needed to drastically reduce the water activity. In some countries, the use of polyhydric alcohol in fillings prevents the manufacturer from labelling the product as a "jam". Therefore, there is also a clearly perceivable demand for "clean labels" in the food packages that cannot be achieved by prior art products that use this alcohol.

EP 372,596 discloses cookies made with low Aw fiber-containing fillings. The filling has a very low water activity (0.2–0.35) so that crispness of the outer dough of the cookies is preserved. However, the filling comprises a significant amount of glycerine or propylene glycol (at least 16 wt. %) as a humectant, and this acts to reduce Aw. Such humectants are considered as non-natural additives that would be an obstacle to a "clean labelling" of the resulting products. These humectants also impart an artificial aftertaste, in particular a bitterness when propylene glycol is used. An undesirable fibrous texture is also imparted to the filling. Furthermore, at the given water activity level, the filling is not soft enough for still providing a pleasant mouthfeel and processability of the material is likely to be difficult.

U.S. Pat. No. 4,774,095 relates to a flavored filling for dough-based products comprising an aqueous phase, a sugar dissolved in the aqueous phase, a thixotropic cohesive network of cellulosic fibrils or microfibrils, an edible polyol as a humectant (at least 5 wt. %) and, a high methoxy pectin in the form of pectin gel lumps. This product has the same disadvantages with regard to poor texture due to the fiber and to poor taste due to the use of non-natural sugars in the filling as in the case of EP 372,596. Labelling may also be a problem for these type products.

EP 515,864 relates to low fat or no fat sugar based confections such as caramels that maintain micro-biological stability over shelf life. In order to replace fat, prevent sugar crystallization and to form a gel, the formulation employs a complex mixture of hydrocolloids that are both cationic and thermosensitive such as carrageenan, furcellarin and gellan.

Therefore, there remains a need for a low water activity aqueous filling for baked flour based products having the characteristics suitable to maintain crispness of baked product and softness of filling using only natural sugars to reduce Aw.

SUMMARY OF THE INVENTION

The present invention provides a low water activity flavored filling with an excellent mouthfeel and palatability with no artificial aftertaste while also exhibiting a stable soft, non-crystallized and non-fibrous texture.

The invention also provides a low water activity flavored filling which has a long shelf life, preferably of 3 to 6 months, and which can preserve crispness of flour based products during this shelf life.

The invention also provides a low water activity flavored filling which is capable to be easily processed in standard available depositing and sandwiching machinery.

These features are provided in a soft and pumpable polyhydric alcohol-free flavored filling for a flour-based product comprising:

(a) an aqueous phase, (b) a mixture of sugars dissolved in the aqueous phase wherein the sugars comprises fructose, glucose and sucrose in relative proportions which prevent crystallization of the filling and set water activity value of the filling from 0.38 to 0.47, and (c) a flavoring and acidifying component in amount effective to lower the pH of the filling to below 5.

Another aspect of the invention relates to a baked flour based product comprising a flavored filling that comprises:

(a) an aqueous phase, (b) a non-crystallized mixture of sugars dissolved in the aqueous phase wherein the mixture of sugars essentially consists of fructose, glucose and sucrose, and (c) a flavoring and acidifying component in an amount effective to lower the pH of the filling to below 5, The filling preferably has a water activity value which prevents the baked flour based product from losing its crispness during at least 4 months of storage.

DETAILED DESCRIPTION OF THE PREFERRED EMBODIMENTS

It has been surprisingly found that a controlled combination of the three sugars with no significant addition of undesirable chemicals, such as the above-identified humectants, could produce a supersaturated solution of suitable water activity level in the range desired for significantly reducing moisture transfers while preventing sugars from crystallizing during an extensive period of time. The absence of crystallization has mainly two advantages: firstly, it gives a soft mouthfeel desired for an attractive product even after an extensive period of storage and secondly, it favors processing of the filling by increasing its processability.

Reducing Aw to such a low range means that relatively large amounts of soluble substances (i.e., sugars) must be added to the aqueous phase. Normal sugars such as glucose (or glucose syrups) and sucrose cannot be used alone or in combination due to their limited solubility that causes crystallization and also poor Aw-lowering properties. It must be noted that sugar concentration in the water phase of the filling must be well above solubility limits (i.e., they are supersaturated solutions) for obtaining the suitable water activity level. An important benefit of the invention is so to avoid the use of non-sugar ingredients in amounts significant to have efficient Aw-lowering properties and high solubility of the group of polyhydric alcohols; i.e., glycerol, sorbitol or other polyols.

It has been determined that the flavored filling of the invention advantageously comprises.

5 to 15 wt % of sucrose, 15 to 40 wt % of glucose, 10 to 50 wt % of fructose.

More preferably, it comprises 8 to 10 wt % of sucrose, 20 to 37 wt % of glucose, 15 to 45 wt % of fructose.

The given sugar percentages are to be considered as based on sugar dry equivalent.

Various sources of natural sugars to meet the given proportions can be used. Crystalline fructose can be used or other sources of fructose such as high fructose corn syrup. Honey or equimolar mixtures of glucose and fructose obtained by enzymatic hydrolysis of sucrose (invert syrup) may also be used, as these have been found to be advantageous for providing highly soluble materials that produce supersaturated solutions easily.

It has also been found that fructose avoids or, at least delays, crystallization when mixed with the other sugars in the aqueous phase. Fructose alone has a very high solubility limit of about 380.8 g/100 g of water, but if used alone at the Aw values required would be much too sweet. Relative sweetening power is usually 124 (at 20C.) for D-fructose, 100 for sucrose and 69 for D-glucose (comparison for 10 g sugar in 100 ml water). Fructose is also more expensive than the two other sugars. Therefore, a balance brought by the two other sugars is advantageously proposed to compensate the deficiencies of fructose.

For that, the use of sucrose, also know as saccharose, has proved to be essential to adjust the sweetness of the filling in the given range using sensory evaluations. Sucrose has also a fairly good solubility limit of about 208.7 g/100 g of water (at 25° C.), but sucrose has poor Aw lowering properties so that it could not be used alone. Sucrose has also the advantage of being a less expensive sugar compared to fructose.

A higher amount of glucose than proposed should not be used as it would easily form crystals during storage because of its low solubility. On the other hand, glucose has proved to be essential to compensate and maintain a more stable balance of sweetness due to the high and varying sweetening power of fructose at different temperatures. Glucose is also less expensive than fructose. Glucose in a powder form is preferred to glucose syrup as some glucose syrups (of low D.E.) may contain too high proportions of saccharides with high molecular weight, and these do not properly contribute to the necessary lowering of Aw.

The combination of the three sugars as proposed prevents crystallization of the filling, at least during the intended shelf life. Crystallization causes hardening of the sugar and is undesirable, as the plastic filling would turn into a hard product which would not make it suitable for use as a filling in a bakery or flour based product.

The reduction of water activity requires a relatively high proportion of sugar in water with a tendency to crystallize which is very high. In particular, the ratio by weight of (sugar):(water) ranges from about (4.5):(1) to (6.3):(1), preferably (6):(1).

Therefore, only the proposed controlled mixture of the three sugars of invention has proved to produce a filling with such a low water activity that is needed to avoid loss of crispness in the flour based product but at the same time which will remain consistently plastic to provide an acceptable mouthfeel and to ensure processability on existing equipment.

As aforementioned, invert sugar which is an equimolar mixture of glucose and fructose may be used as replacement of some or all of the glucose and fructose in the given proportions. However, whenever invert sugar is used, a proportion of sucrose also should be included.

The addition of other types of sugars such as maltose or lactose in significant amounts (at least 3% by weight) is not suitable. These sugars would increase the risk of crystallization due to their very limited solubility and relatively poor Aw lowering properties.

Baked flour-based products of the invention, such as sweet biscuits, may have a 'per se' water activity of 0.3 or below before they are filled with the filling of the invention. However, it has been found that in baked flour-based products, loss of desirable crispness occurs when the water activity surpasses a critical equilibrium value. The value depends to some extent to the formulation of the dough, but for most biscuits it was found that the value should be between 0.35 to 0.5, and preferably between 0.39 and 0.43. If the equilibrium water activity of the biscuit increases above that critical maximum value due to moisture transfer from the filling to the biscuits, the biscuit will loss its crispness. The invention resolves this problem by reducing drastically the water activity of the aqueous filling in such a way that at equilibrium between the filling and biscuit, the equilibrium water activity of the dough-based product is at or below the critical range, i.e., 0.35 to 0.5, preferably 0.38 to 0.47 and more preferably 0.39 to 0.43. Therefore, according to an important aspect of the invention, a certain moisture transfer is allowed between the biscuit and the filling due to the low water activity level of the biscuit itself but at the equilibrium, the biscuit is kept crispy and the filling is kept soft. It must be understood that if the filling would transfer too much water to the biscuit, the result would lead to both a hard and non-palatable filling and a soggy biscuit.

In the context of the invention, the water activity or Aw refers to the ratio between the partial vapour pressure of water in the sample and the vapour pressure of pure water at the same temperature. It must be noted that the water activity values in the present description have been measured by the "Aqua Lab" water activity meter model CX-3 by Decagon Devices Inc.

It was also found that the equilibrium water activity was dependent on the amount of filling with respect to the dough part. If the amount of the filling is small, a higher water activity is tolerated and vice versa. It was found that the optimum weight ratio of the filling part to the dough part in the product preferably should be between 25:75 to 35:65, and more preferably 30:70.

The flavored filling of the invention preferably comprises an amount of fruit pulp for the flavored component. The amount of fruit pulp is preferably at least of 15 to 28 wt % of the filling. It should be noted that the fruit pulp contributes in part or entirely to the constitution of the aqueous phase. Sources of fruit pulp are not limited, and can be strawberry, apple, orange, raspberry, prune, rhubarb, etc. The addition of fruit pulp in the given amount has the consequence of lowering the pH of the filling below 5 and, preferably to a range of 3 to 3.4. In general, a small amount of pectin is preferred for use to confer after setting, a firmer texture to the filling. An amount of less than 1% by weight of pectin is sufficient for this purpose. For the pectin to react, an acidic medium must be introduced otherwise pectin will not react and the filling will remain more liquid as compared to the sticky and firm texture of the usual fruit jam which is more desirable to consumers.

After mixing the various ingredients for making the filling, the moisture is evaporated until the final moisture content is achieved. A suitable final moisture content is considered to be 8 to 12%. It has been found that under 9% moisture content, the filling formulation would be too hard after equilibrium has occurred with the biscuit. Low moisture contents also result in difficulties for pumping the filling into the conventional deposit machines.

The use of non-natural Aw lowering agents such as humectants should be avoided at least in effective amounts. As effective amounts of humectants such as polyols, it is meant amounts sufficient to lower the Aw by at least 0.02 points. Effective amounts would be amounts of glycerol from about 1% wt of humectant in the final filling. By not utilizing humectants for their known purpose, advantages in the product can be obtained. Moreover, these components can be completely eliminated without deleteriously affecting the present compositions.

Although the low Aw flavored filling is soft, depending upon specific filling formulations, it has been found difficult to deposit using conventional sandwich stencil depositing equipment used in the biscuit industry. By conventional stencil depositing equipment, what is meant is deposit machines such as standard "high speed creaming" machines that are commercially available from APV Baker Limited, SASIB UK LTD, PETERS USA LTD or others of various types and configurations such as 4-lane, 2-lane or 6-lane, etc., high speed creamers. This filling problem has been solved by adding a certain amount of a hydrogenated vegetable fat to the filling formulation. The fat participates in the formulation to reduce stickiness and impart lubrication for machining and cutting the deposit process into the baked product. The hydrogenated vegetable fat also improves the finished appearance of the jam in that it gives a better gloss to the surface. The use of animal fat, even if possible in theory, would be less desirable because of its taste.

Of course, other depositing machines may be used as well for which there are less depositing problems. These include the PSD (Pacing Sandwiching Depositor) that is commercially available from SASIB UK LTD and others. In that case, the use of hydrogenated fat may be avoided.

The hydrogenated vegetable fat may advantageously have a melting point ranging from 28 to 35° C. Preferably, the hydrogenated vegetable fat is a vegetable fat from soya which has a melting point of between 30 to 34° C. It is preferably used in a water-in-oil emulsion with the aqueous phase in an amount from 6 to 9% by weight of the total filling. The importance of the melting point is related to the final product mouthfeel and its ability to be emulsified and to stay emulsified during the whole process including filling production and depositing. Suitable emulsifiers are glycerol-based lipids such as glycerol monostearate having a mono form of between 55 to 90%. Monostearate is preferred as the mono form is the most active form, but glycerol-based lipids having different levels of glycerol monostearate, distearate and tristearate may also be used. The concentration of the emulsifier has proved to be important since above a certain value, air incorporation may cause undesirable color changes of certain fruit-flavored fillings. For instance, strawberry filling may turn from a red color to an undesirable pink color in the presence of higher levels of emulsifier. Therefore, the concentration of emulsifier is preferably in the range of 0.15 to 0.45%, and preferably 0.15–0.25% by weight of the fruit pulp content in the filling. The consistency of the filling is changed sufficiently so that it can flow more easily in standard deposit machines.

It has been found critical to achieve the correct amount of emulsification. Too little would not ensure that the fat would stay in emulsion whereas too much will create the possibility of aerating a fruit based filling during the process. As stated above, aerating may change the color of the fruit based filling from red to pink because of the incorporation of small air bubbles into the filling. The emulsifier is added in proportion to the fruit pulp as the fruit pulp is the main contributor of water to the mixture that needs to be emulsified.

Additional ingredients such as natural or artificial flavoring agents and coloring agents can be added to the filling as desired. Similarly, acids such as maleic or citric acids may be added in suitable amount to enhance acidic taste and assist in the setting of the gel. Pectin may or may not also be added to modify the fluidity of the filling depending on the type of application. When pectin is used, the pH is in a range of 3 to 3.8.

The baked flour-based product may be chosen among short biscuits, cookies, or wafers or a combination thereof, or other similar crispy dough-based products or combinations thereof.

The invention encompasses a baked flour-based product comprising the flavored filling of the invention. Typically preferred baked flour-based products are short dough biscuits comprising flour, sugar, fat, salt, water, milk and baking powder in suitable amounts.

According to the present invention, a short dough biscuit is biscuit typically having to 100 parts of flour 30–45 parts of sugar and 20–45 parts of fat.

The baked flour-based products of the invention may have a water activity ranging from 0.15 to 0.2 before it is combined with the flavored filling. The baked flour based products of the invention remain crispy after equilibrium is reached with the filling wherein Aw equilibrium is obtained at values at or below 0.35–0.5, and preferably at or below 0.38–0.43. For instance, it was found that the critical water activity was 0.4 for cookies and 0.44 for wafers.

The flavored sugar filling preferably represents between 25 to 35% by weight of the filled product. The filled flour based product exhibits a shelf life of about 6 months or more at ambient temperature.

EXAMPLES

The following examples illustrate certain preferred embodiments of the invention.

Example 1

Filling Preparation

A strawberry jam type filling having Aw in the desired range (0.39–0.43) is prepared according to the following formulation of Table 1.

TABLE 1

| INGREDIENTS | % BY WEIGHT |
| --- | --- |
| Sucrose | 7.9 |
| Pectin (if required) | 0.3 |
| Citric acid | 0.2 |
| Glucose (crystalline) | 22.0 |
| Fructose | 44.0 |
| Strawberry pulp | 22.1 |
| Glycerol Monostearate | 0.1 |
| Vegetable fat | 7.0 |
| Color, Flavor | Csp |

In a second embodiment, the filling is prepared according to the ingredients of Table 2 as follows.

TABLE 2

| INGREDIENTS | % BY WEIGHT |
| --- | --- |
| Sucrose | 7.9 |
| Pectin (if required) | 0.35 |
| Citric acid | 0.2 |
| Glucose (crystalline) | 20.5 |
| Invert sugar | 42.0 |
| Strawberry pulp | 22.1 |
| Glycerol Monostearate | 0.1 |
| Vegetable fat | 7.0 |
| Color, Flavor | Csp |

After mixing the ingredients, moisture is evaporated until a final soluble solids content in a range of 84 to 86% is achieved. Despite the low moisture content the fruit filling is still soft and elastic and performs very well as a filling for biscuits thanks to the specific choice and proportions of sugars in the filling.

Example 2

Dough Preparation and Final Depositing

The short dough biscuit is prepared separately according to the formulation of Table 3 as follows.

TABLE 3

| INGREDIENTS | % BY WEIGHT |
| --- | --- |
| Sugar | 20 |
| Vegetable fat | 13 |
| Salt | 0.3 |
| Water | 7.0 |
| Flour | 59 |
| Salt | 0.5 |
| Lecithin | 0.5 |
| Milk powder | 2 |
| Flavoring | 0.2 |
| Baking powder | 0.5 |

The biscuit is made by mixing the ingredients in a mixer in two stages; Fat, sugar, water, salt, lecithin and flavoring are mixed together for 4 minutes. Flour, milk powder, and baking powder are then added and mixed for a further 3 minutes. The dough is then put into a rotary moulder to form the required shape and weight. The shaped dough pieces are the baked in an oven for approximately 5 minutes to the desired color and moisture (typically between 2 and 3% moisture).

Depositing is carried out while the flavored filling is maintained at a temperature of 40 to 45° C. in the depositing mode so as to impart a pumpable consistency to the filling. The amount of pectin can be optionally lowered, increased or removed to change the consistency of the filling and make it easier to pump. In particular, the level of acids and pectin may vary according to the nature of the fruit pulp.

In a "Peters" depositor, the filling passes under a stencil of the depositor and is wire cut onto a first biscuit portion while the biscuit portion rests in horizontal position. A second biscuit is placed on top of the deposited filling. A few seconds after placement of the second biscuit, the product is placed in vertical position

Example 3

Comparative Sensory Rating Tests—Standard Shelf Life Study

Sweet biscuits were filled with 25% weight of low Aw-strawberry jam (formula of Table 1) adjusted to three different water activities, namely Aw=0.42; Aw=0.52 and Aw=0.60. The filled cookies were packed and heat sealed in moisture-proof metallized polypropylene pouches and stored at 25° C. at 80% relative humidity. After two-months storage they were opened and tested for crispness (sensory) according to the following ratings:

Very crispy

Crispy

Slightly crispy

Not crispy

The water activity of the biscuits was also measured after the two-months storage. Results were as follows:

| Jam Aw | Sensory rating | Final Aw of biscuit |
| --- | --- | --- |
| 0.42 | Very crispy | 0.35 |
| 0.52 | Slightly crispy | 0.44 |
| 0.61 | Not crispy | 0.47 |

This example demonstrates that using a jam with Aw above the target value (Aw=0.42) does not adequately preserve crispness during storage. It also shows that when the water activity of the sweet biscuit increases above about 0.40, crispness is not preserved.

Example 4

Accelerated Shelf-life Study (High Relative Humidity)

Sweet biscuits were filled (25% weight) with strawberry jam having an Aw=0.42 (formula of Table 1), packed in metallized polypropylene pouches and stored at 25° C. and a relative humidity of 80%. Samples were evaluated (sensory) for crispness at 1, 2, 3, and 4 months (4 months being equivalent to 6 months).

Results were as follows:

| Month | Sensory rating |
| --- | --- |
| 1 | Very crispy |
| 2 | Crispy |
| 3 | Crispy |
| 4 | Crispy |

As is clear from the foregoing, various modifications of the present invention may be made without departure from the spirit and scope of the disclosure and description, and the invention may be embodied and/or practiced suitably in the absence of and/or to the exclusion of physical structure and/or process steps and/or manipulations, conditions, substances employed, present and/or manipulated, and/or limitations not specifically disclosed therein.

What is claimed is:

1. A soft and pumpable polyhydric alcohol-free flavored filling for baked flour based products comprising:
   (a) an aqueous phase,
   (b) a mixture of sugars dissolved in the aqueous phase wherein the mixture comprises 10 to 50 wt % fructose, 15 to 40 wt % glucose and 5 to 15 wt % sucrose to delay or prevent crystallization and set water activity value from 0.38 to 0.43, and
   (c) a flavoring and acidifying component in amount effective to lower the pH of the filling below 5.

2. The flavored filling according to claim 1, which contains:
   8 to 10 wt % of sucrose,
   20 to 37 wt % of glucose, and
   15 to 45 wt % of fructose.

3. The flavored filling according to claim 1 which further comprises an amount of hydrogenated vegetable fat having a melting point ranging from 28 to 35° C.

4. The flavored filling according to claim 3, wherein the hydrogenated vegetable fat is present with the aqueous phase in an amount from 6 to 9 wt. % of the total weight of the filling.

5. The flavored filling according to claim 1, wherein the aqueous phase and flavoring component are essentially constituted of fruit pulp in an amount ranging from 15 to 28% wt.

6. The flavored filling according to claim 5, which further comprises an emulsifier added to the vegetable fat with the aqueous phase in a proportion ranging from 0.15 to 0.45 wt. % of the fruit pulp weight.

7. The flavored filling according to claim 6, wherein the emulsifier is glycerol monostearate, distearate, tristearate or a combination thereof.

8. A flour based product comprising a filling part and a dough part, wherein the filling part is according to claim 1 and the dough part has proportions of flour, sugar, fat and other baking ingredients such that the baked flour based product has a water activity Aw at equilibrium that is below 0.5, and the filling part and dough part are present at a weight ratio of between 25:75 to 35:65.

9. The product of claim 8, wherein the filling part and dough part are present at a weight ratio of between 30:70 and the Aw at equilibrium is between 0.35 and 0.47.

10. A baked flour-based product comprising a flavored filling part and a dough part wherein the filling part comprises:
    (a) an aqueous phase,
    (b) a non-crystallized mixture of sugars dissolved in the aqueous phase wherein the mixture of sugars essentially consists of 10 to 50 wt % fructose, 15 to 40 wt % glucose and 5 to 15 wt % sucrose, and
    (c) a flavoring and acidifying component in an amount effective to lower the pH below 5,
    wherein the filling part is polyhydric alcohol-free and has a water activity value of below 0.43 which prevents the baked flour based product from losing its crispness for at least 4 months; the filling part and dough part are present at a weight ratio of between 25:75 to 35:65; and the product has a water activity at equilibrium that is below 0.5.

11. The product of claim 10 wherein the filling part and dough part are present at a weight ratio of between 30:70 and the Aw at equilibrium is between 0.35 and 0.47.

* * * * *